United States Patent [19]

Kniel

[11] Patent Number: 4,485,043

[45] Date of Patent: Nov. 27, 1984

[54] PROCESS FOR PRODUCING 1-AMINO-4-HYDROXY-ANTHRAQUINONES

[75] Inventor: Paul Kniel, Muttenz, Switzerland

[73] Assignee: Ciba-Geigy AG, Basel, Switzerland

[21] Appl. No.: 399,232

[22] Filed: Jul. 19, 1982

[30] Foreign Application Priority Data

Jul. 30, 1981 [CH] Switzerland .................. 4943/81

[51] Int. Cl.³ ........................................... C07C 97/26
[52] U.S. Cl. .................................................. 260/380
[58] Field of Search ............... 260/380, 692; 568/633, 568/635

[56] References Cited

FOREIGN PATENT DOCUMENTS 16432 10/1980 European Pat. Off. .

OTHER PUBLICATIONS

Dr. Otto-Albrecht Neumiller, *Rompps Chemin-Lexikon*, 1974, p. 2644.
Ullmann *Encyklopadie der Technischen Chemie*, vol. 18, pp. 380–381.
*Tetrahedron*, vol. 30 (1974), pp. 1379–1382, McKillop et al., "The Use of Phase-Transfer Catalysis for the Synthesis of Phenol Ethers".

*Primary Examiner*—Glennon H. Hollrah
*Assistant Examiner*—Raymond Covington
*Attorney, Agent, or Firm*—Wenderoth, Lind & Ponack

[57] ABSTRACT

1-Amino-4-hydroxy-2-phenoxy- or -2-alkoxyanthraquinones are obtained by reaction of a 1-amino-2-halo-4-hydroxyanthraquinone with an alcohol or phenol. The reaction is performed in an organic solvent in the presence of an alkaline-acting agent and a phase-transfer catalyst.

14 Claims, No Drawings

PROCESS FOR PRODUCING 1-AMINO-4-HYDROXY-ANTHRAQUINONES

The invention relates to a process for producing 1-amino-4-hydroxy-2-phenoxy- or -2-alkoxy-anthraquinones.

These compounds have been known for a considerable time, and some of them are valuable disperse dyes for dyeing textile material made from polyester.

The 1-amino-2-alkoxy-4-hydroxyanthraquinone compounds are produced, according to the German Auslegeschrift No. 2,405,782, for example by reacting a primary alcohol with 1-amino-2-chloro-4-hydroxyanthraquinone in the presence of phenol, alkaline-acting agents and polyethylene glycols, in which process the solvent used is either excess alcohol or a further solvent, preferably a polar aprotic solvent, such as N-methylpyrrolidone, dimethylformamide, dimethylsulfoxide or dimethylsulfone. The solvents mentioned are however not the most favourable for producing 1-amino-2-alkoxy-4-hydroxyanthraquinones in large amounts, since the stability of these solvents, particularly at elevated temperatures, leaves much to be desired, and their regeneration is relatively expensive.

The 1-amino-2-phenoxy-4-hydroxyanthraquinones are obtained, according to the European application No. 16432, by reacting 1-amino-2-chloro-4-hydroxyanthraquinone, in an aqueous medium at 120°–150° C., with a phenol in the presence of a phase-transfer catalyst. This process requires pressure-proof apparatus and necessitates the use of a large excess of phenols, and costly means have to be applied to remove the unreacted phenols from the aqueous filtrates after the reaction.

The object of the present invention was to provide an improved process for producing 1-amino-4-hydroxy-2-alkoxy- or -2-phenoxy-anthraquinones, which process would overcome to the greatest possible extent the above-mentioned disadvantages of the known processes.

This object has been achieved by the process according to the invention. The process can be performed in solvents which are more stable and easier to regenerate, for example chlorobenzene, nitrobenzene or ethylene glycol ethers; a large excess of phenol is not necessary, and pressure-proof apparatus can be dispensed with.

The present invention thus relates to a process for producing 1-amino-4-hydroxy-anthraquinones of the formula 1

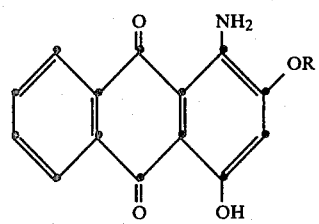

(1)

wherein R is a phenyl group which is unsubstituted or substituted by chlorine, bromine, $C_1$–$C_4$-alkyl or $C_1$–$C_4$-alkoxy, or it is the radical of an alcohol, by reaction of a compound of the formula 2

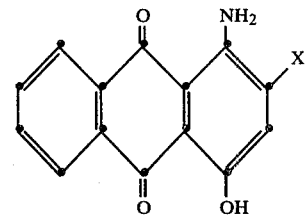

(2)

wherein X is chlorine or bromine, with a compound ROH, in which R has the meaning defined above, in the presence of an alkaline-acting agent, in which process the reaction is carried out in an organic solvent, in the presence of a quaternary ammonium salt, a phosphonium compound or a crown ether, as phase-transfer catalyst.

Suitable compounds ROH are phenols or alcohols.

The phenols are for example: 2-, 3- or 4-chlorophenol, 4-bromophenol, 2,4-dichlorophenol, o-, m- or p-cresol, the xylenols, such as 2,4-dimethylphenol, or 4-ethylphenol, 4-isopropylphenol, 4-tert-butylphenol or 4-hydroxyanisole, preferably however phenol.

Suitable alcohols for the process according to the invention are for example the following compounds: butanol-1, amyl alcohol, hexanol-1, heptanol-1, octanol-1, decyl alcohol, lauryl alcohol, stearyl alcohol, palmityl alcohol, 2-ethylhexanol-1, benzyl alcohol, 2-phenylethanol or 3-phenylpropanol. Glycols or glycol ethers are however preferably used, for example the following: ethylene glycol, 1,2- or 1,3-propylene glycol, butanediol-1,3, butanediol-1,4, 3-methylbutanediol-1,3, pentanediol-1,5, hexanediol-1,6, octanediol-1,8, neopentyl glycol, 2-phenoxyethanol, o-, m- or p-cresoxyethanol, 3-phenoxypropanol, m- or p-cresoxypropanol, ethylene glycol monomethyl ether, ethylene glycol monoethyl ether, diethylene glycol, triethylene glycol, diethylene glycol-monomethyl ether, -monoethyl ether or -monohexyl ether and triethylene glycol monomethyl ether.

Particularly preferred among these compounds are: hexanediol-1,6, ethylene glycol, diethylene glycol monomethyl ether, phenoxyethanol and m- or p-cresoxyethanol, 3-phenoxypropanol as well as m- or p-cresoxypropanol.

The phenols are used generally in an amount of 1 to 1.5 mols, preferably 1.1 to 1.2 mols, per mol of the employed anthraquinone compound of the formula (2); and the alcohols in an amount of 2 to 10 mols, preferably 2 to 4 mols. The reaction of the 1-amino-4-hydroxy-2-haloanthraquinone compound of the formula (2) with an alcohol is preferably performed in the presence of about 0.5 to 1 mol of a phenol per mol of anthraquinone compound. The phenol used is in particular the unsubstituted phenol itself, and also a cresol, xylenol or chlorophenol.

Suitable alkaline-acting agents for the reaction are for example: alkali metal hydroxides, such as sodium hydroxide, potassium hydroxide, alkali metal carbonates, such as sodium hydrogen carbonate, potassium hydrogen carbonate, sodium carbonate or potassium carbonate, and mixtures of these compounds. Of the stated compounds, potassium hydroxide and in particular potassium hydrogen carbonate and potassium carbonate are especially preferred.

Solvents which are suitable for the process according to the invention are aprotic non-polar solvents having a boiling point above 110° C. They are preferably halobenzenes, such as chlorobenzene, bromobenzene, dichlorobenzene, trichlorobenzene or chlorotoluene; alkylbenzenes, such as toluene, o-, m- or p-xylene or ethylbenzene; nitrobenzenes, such as nitrobenzene or nitrotoluene; and also glycol diethers, for example ethylene glycol diethyl ether, diethylene glycol-dimethyl ether or -diethyl ether or triethylene glycol dimethyl ether. Particularly preferred among these are chlorobenzene, nitrobenzene, o-dichlorobenzene, toluene, xylene, diethylene glycol-dimethyl ether and -diethyl ether.

Suitable phase-transfer catalysts for the process according to the invention are:
quaternary ammonium or phosphonium compounds of the formula (3)

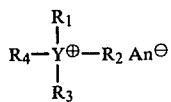

wherein $R_1$-$R_4$ independently of one another are each a low- or high-molecular organic radical, particularly an unsubstituted or substituted alkyl, cycloalkyl or aryl group, Y is nitrogen or phosphorus, and $An^{\ominus}$ is an anion.

Compounds which have proved particularly satisfactory are quaternary ammonium salts of the given formula (Y=N), in which $R_1$, $R_2$ and $R_3$ independently of one another are each $C_1$-$C_{18}$-alkyl, and $R_4$ is $C_1$-$C_{18}$-alkyl, benzyl or phenyl.

Very particularly preferred are quaternary ammonium salts of the given formula, in which $R_1$, $R_2$ and $R_3$ are each $C_1$-$C_8$-alkyl, and $R_4$ is $C_1$-$C_{18}$-alkyl or benzyl.

Suitable alkyl groups are for example: $C_1$-$C_{18}$-alkyl groups, such as the methyl, ethyl, propyl, n-butyl, hexyl, octyl, dodecyl and octadecyl groups, and $C_1$-$C_{18}$-alkyl groups substituted by a hydroxyl, cyano or phenyl group, such as the 2-hydroxyethyl, 2-hydroxypropyl, 2-cyanoethyl or 2-phenylethyl group.

Cycloalkyl groups $R_1$-$R_4$ which are suitable are in particular $C_5$-$C_6$-cycloalkyl groups, such as the cyclopentyl and the cyclohexyl groups, and the cyclopentyl and cyclohexyl groups substituted by $C_1$-$C_4$-alkyl groups.

Suitable aryl groups are in particular phenyl groups substituted by $C_1$-$C_4$-alkyl groups.

The anion $An^{\ominus}$ is especially a halide ion, particularly $Cl^{\ominus}$, as well as the hydrogen sulfate ion.

Quaternary ammonium compounds usable according to the invention are for example: tetrabutylammonium bromide or -chloride, dodecyltrimethylammonium chloride, n-hexadecyltributylammonium chloride, tetrapropylammonium chloride, benzyltriethylammonium chloride, benzyltributylammonium bromide, benzyltrihexylammonium bromide, benzyltrioctylammonium bromide, tetrabutylammonium iodide, trioctylmethylammonium chloride, N-octylpyridinium bromide, N-dodecylpyridinium bromide, cyclohexyltriethylammonium bromide, n-dodecyltriethylammonium bromide, n-octyltributylammonium bromide, n-hexadecyltrimethyammonium bromide, n-hexadecyltriethylammonium bromide, n-hexadecyltripropylammonium bromide, n-dodecyl-bis-($\beta$-hydroxyethyl)-benzylammonium chloride and n-hexadecyl-tri-($\beta$-hydroxyethyl)ammonium chloride.

Suitable phosphonium compounds are for example: n-hexadecyltributylphosphonium bromide, tetrabutylphosphonium chloride, tetraphenylphosphonium bromide and trioctylethylphosphonium bromide.

Phase-transfer catalysts which can be used are also crown ethers, for example 18-crown-6, dibenzo-18-crown-6 or dicyclohexano-18-crown-6.

Preferred catalysts are: tetrabutylammonium bromide or -chloride, n-hexadecyltributylammonium chloride, tetrapropylammonium chloride, benzyltributylammonium bromide or -chloride, and trioctylmethylammonium bromide or -chloride.

The required amount of phase-transfer catalyst can vary within wide limits. In general, amounts of 0.1 to 50 percent by weight, preferably 1 to 20 percent by weight, relative to the weight of 1-amino-4-hydroxy-2-haloanthraquinone, have proved satisfactory.

The process can be performed for example by dissolving the anthraquinone in the solvent, adding the phase-transfer catalyst and the phenol or the alcohol, as well as the alkaline-acting compound, and subsequently heating the mixture at 110°-180° C. for about 2-30 hours.

After completion of the reaction, the reaction mixture is processed in a manner known per se, for example by dilution with low aliphatic alcohols, such as ethanol, propanol or preferably methanol, in the course of which the product is precipitated, and then isolated in a known manner.

The following Examples serve to further illustrate the invention. The percentages therein are percent by weight, and the temperature values are given in degrees Centigrade.

EXAMPLE 1

29.75 g of 1-amino-2-chloro-4-hydroxyanthraquinone (titer 92%), 120 ml of chlorobenzene, 5 g of tetrabutylammonium bromide, 10.8 g of phenol and 6.48 g of potassium hydroxide are heated within 1 hour, with stirring, to boiling temperature (131°-133° C.), and then stirred for 5 hours at the boiling temperature. Reaction water occurring during the process is distilled off at the side, together with about 10 ml of chlorobenzene. The reaction mixture is subsequently cooled to 60° C., and 50 ml of methanol are added; the precipitate is filtered off, washed with methanol and water and then dried. The yield is 29.9 g of 1-amino-4-hydroxy-2-phenoxyanthraquinone (90.3% of theory). The product dyes polyester in exactly the same manner as the commercial product does, produced from 1-amino-2-chloro-4-hydroxyanthraquinone in phenol in the presence of phenolate.

EXAMPLE 2 (COMPARATIVE EXAMPLE)

Example 1 is repeated without the addition of tetrabutylammonium bromide. The isolated product consists of unreacted 1-amino-2-chloro-4-hydroxyanthraquinone.

EXAMPLE 3

(a) The procedure is carried out as in Example 1 except that 12.5 g of 1.4-cresol are used in place of phenol. The yield is 30.5 g (88.3% of theory) of pure 1-amino-4-hydroxy-2-(4'-methylphenoxy)-anthraquinone.

(b) The same result as under (a) is obtained by using, instead of tetrabutylammonium bromide, 5 g of crown ether, 18-crown-6, as the phase-transfer catalyst.

EXAMPLE 4

The procedure is carried out as in Example 1 except that 14.3 g of 4-methoxyphenol are used instead of phenol, and 5 g of hexadecyl-tributylphosphonium bromide instead of tetrabutylammonium bromide. The yield is 33.2 g (91.9% of theory) of pure 1-amino-4-hydroxy-2-(4'-methoxyphenoxy)-anthraquinone.

EXAMPLE 5

(a) 30.1 g of 1-amino-2-chloro-4-hydroxyanthraquinone (titer 91%), 30 ml of nitrobenzene, 5 g of methyltrioctylammonium chloride, 10.4 g of phenol, 39 g of 1,6-hexanediol and 13.2 g of potassium carbonate are heated to 150° C., and then stirred at 150°–153° C. for 8 hours. To the reaction mixture are subsequently added 95 ml of methanol; the precipitate is filtered off, washed with methanol and water and then dried. The yield is 29.8 g of 1-amino-4-hydroxy-2-(6'-hydroxy-hexoxy)-anthraquinone (83.8% of theory). The dyeing properties of the product correspond to those of the commercial product produced in the customary manner.

(b) The same result as under (a) is obtained by using 1.2-dichlorobenzene or diethyl diglycol (diethylene glycoldiethyl ether) in place of nitrobenzene.

EXAMPLE 6 (COMPARATIVE EXAMPLE)

Example 5 is repeated but without the addition of methyltrioctylammonium chloride. The isolated product contains, besides the desired compound, more than 30% of by-products.

EXAMPLE 7

The procedure is carried out as in Example 5 except that 45.6 g of 2-phenoxyethanol are used instead of 1.6-hexanediol. The yield is 35.2 g (93.7% of theory) of pure 1-amino-4-hydroxy-2-(2'-phenoxyethoxy)-anthraquinone.

EXAMPLE 8

27.4 g of 1-amino-2-chloro-4-hydroxyanthraquinone (titer 96%), 48 g of diethyl diglycol, 5 g of methyltrioctylammonium chloride, 2.4 g of phenol, 94 g of glycol and 12 g of potassium carbonate are heated in a nitrogen atmosphere, with stirring, for 6 hours at 120°–125° C. To the mixture are then added at 60° C. 90 g of methanol and 11 g of acetic acid; the reaction mixture is filtered at room temperature, and the product obtained is washed with methanol and water and then dried. There are thus obtained 24.5 g of 1-amino-4-hydroxy-2-(2'-hydroxyethoxy)-anthraquinone, corresponding to a yield of 85.2% of theory. The product is the same as the commercial product (BP 1,085,685) produced, according to the prior art, in excess glycol without further solvent.

EXAMPLE 9

(a) 27.4 g of 1-amino-2-chloro-4-hydroxyanthraquinone (titer 96%), 44 g of nitrobenzene, 5 g of methyltrioctylammonium chloride, 9.4 g of phenol, 60 g of diethylene glycol methyl ether and 12 g of potassium carbonate are heated, with stirring, for 6 hours at 150°–153° C. To the reaction mixture are subsequently added at 60° C. 90 g of methanol; the precipitate is then filtered off, washed with methanol and water and dried. The yield is 23.2 g of pure 1-amino-4-hydroxy-2-[2-(2-methoxyethoxy)ethoxy]-anthraquinone (67.6% of theory).

(b) The same result as under (a) is obtained by using, in place of methyltrioctylammonium chloride, 5 g of crown ether, 18-crown-6, as phase-transfer catalyst.

EXAMPLE 10

The procedure is carried out as in Example 1 except that 14.8 g of p-chlorophenol are used in place of the phenol. There is thus obtained 1-amino-4-hydroxy-2-(4'-chlorophenoxy)-anthraquinone, which dyes polyester material in a red shade.

EXAMPLE 11

The procedure is carried out as in Example 5 except that a mixture of 15.2 g of 2-phenoxyethanol, 16.7 g of 2-(m-cresoxy)-ethanol and 16.7 g of 2-(p-cresoxy)-ethanol is used in place of 1,6-hexanediol. The resulting yield is 33.35 g (86.8% of theory) of a dye consisting of three pure components, namely: 1-amino-4-hydroxy-2-(2'-phenoxyethoxy)-anthraquinone, 1-amino-4-hydroxy-2-[2'-(m-cresoxyethoxy]-anthraquinone and 1-amino-4-hydroxy-2-[2'-(p-cresoxyethoxy]-anthraquinone.

What is claimed is:

1. A process for producing a 1-amino-4-hydroxyanthraquinone of the formula 1

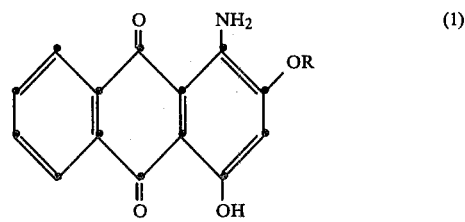

wherein R is a phenyl group which is unsubstituted or substituted by chlorine, bromine, $C_1$–$C_4$-alkyl or $C_1$–$C_4$-alkoxy, or it is the radical of an alcohol, by reaction of a compound of the formula 2

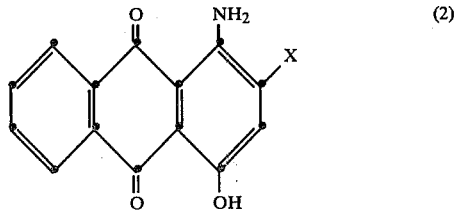

wherein X is chlorine or bromine, with a compound ROH, which is a phenol or an alcohol, in which R has the meaning defined above, in the presence of an alkaline-acting agent, in which process the reaction s carried out in an organic solvent which is not a phenol or an alcohol, in the presence of a quaternary ammonium salt, a phosphonium compound or a crown ether, as phase-transfer catalyst and when the ROH compound is a phenol, there are used a total of 1 to 1.5 mols of phenol compound per anthraquinone compound of the formula (2) and when the ROH compound is an alcohol, there are used a total of 2–10 mols of alcohol per mol of the anthraquinone compound of the formula (2).

2. The process according to claim 1, wherein the phenol used is the unsubstituted phenol.

3. The process according to claim 1, wherein the alcohol used is hexanediol-1,6, ethylene glycol, diethylene glycol monomethyl ether, phenoxyethanol or m- or p-cresoxyethanol.

4. The process according to claim 3, wherein the reaction with the alcohol is performed in the presence of a phenol.

5. A process according to claim 1, wherein there are used 1.1-1.2 mols, of phenol per mol of an anthraquinone compound of the formula (2).

6. A process according to claim 1, wherein there are used 2-4 mols, of alcohol per mol of an anthraquinone compound of the formula (2).

7. The process according to claim 4, wherein the reaction with the alcohol is performed in the presence of 0.5-1 mol of a phenol per mol of an anthraquinone compound of the formula (2).

8. The process according to claim 1, wherein the organic solvent used is a halobenzene, alkylbenzene or nitrobenzene, or a glycol ether.

9. The process according to claim 8, wherein there is used: chlorobenzene, o-dichlorobenzene, nitrobenzene, toluene, xylene, diethylene glycol dimethyl ether or diethylene glycol diethyl ether.

10. The process according to claim 1, wherein the phase-transfer catalyst used is a quaternary ammonium or phosphonium compound of the formua (3)

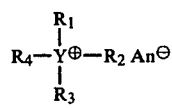
(3)

wherein $R_1$–$R_4$ independently of one another are each a low- or high-molecular organic radical, especially an unsubstituted or substituted alkyl, cycloalkyl or aryl group, Y is nitrogen or phosphorus, and $An^\ominus$ is an anion.

11. The process according to claim 10, wherein there is used a quaternary ammonium compound of the formula (3) in which $R_1$, $R_2$ and $R_3$ independently of one another are each $C_1$–$C_{18}$-alkyl, and $R_4$ is $C_1$–$C_{18}$-alkyl, benzyl or phenyl.

12. The process according to claim 11, wherein there is used a quaternary ammonium compound of the formula (3) in which $R_1$, $R_2$ and $R_3$ independently of one another are each $C_1$–$C_8$-alkyl, and $R_4$ is $C_1$–$C_{18}$-alkyl or benzyl.

13. The process according to claim 12, wherein there is used: tetrabutylammonium bromide or -chloride, n-hexadecyltributylammonium chloride, tetrapropylammonium chloride, benzyltributylammonium bromide or -chloride or trioctylmethylammonium bromide or -chloride.

14. The process according to claim 1, wherein 1-amino-2-chloro-4-hydroxyanthraquinone is reacted with 1-1.5 mols of phenol per mol of anthraquinone in a solvent selected from the group comprising: chlorobenzene, o-dichlorobenzene, nitrobenzene, toluene, xylene, diethylene glycol dimethyl ether or diethylene glycol diethyl ether, in the presence of tetrabutylammonium bromide or -chloride, n-hexadecyltributylammonium chloride, tetrapropylammonium chloride, benzyltributylammonium bromide or -chloride or trioctylmethyl-ammonium bromide or -chloride.

* * * * *